(12) United States Patent
Agnew et al.

(10) Patent No.: US 7,707,817 B2
(45) Date of Patent: May 4, 2010

(54) FUEL PROCESSOR

(75) Inventors: Gerard D Agnew, Uttoxeter (GB);
Ritindar Singh, Cranfield (GB)

(73) Assignee: Rolls-Royce, PLLC, London (GB)

( * ) Notice: Subject to any disclaimer, the term of this patent is extended or adjusted under 35 U.S.C. 154(b) by 982 days.

(21) Appl. No.: 11/342,839

(22) Filed: Jan. 31, 2006

(65) Prior Publication Data

US 2006/0275633 A1  Dec. 7, 2006

(30) Foreign Application Priority Data

Feb. 9, 2005  (GB) ................. 0502608.3

(51) Int. Cl.
*F02C 3/22* (2006.01)
(52) U.S. Cl. ............ 60/39.465; 60/39.461; 60/39.463; 60/39.12; 60/780
(58) Field of Classification Search ............ 60/39.465, 60/39.463, 780, 39.12, 39.461; 429/12
See application file for complete search history.

(56) References Cited

U.S. PATENT DOCUMENTS

| | | | |
|---|---|---|---|
| 4,434,613 A * | 3/1984 | Stahl ........................... 607/84 |
| 5,934,064 A | 8/1999 | Newby |
| 5,942,203 A | 8/1999 | Van Dijk |
| 6,085,512 A | 7/2000 | Agee |
| 6,205,768 B1 * | 3/2001 | Dibble et al. ............ 60/39.511 |
| 6,269,625 B1 * | 8/2001 | Dibble et al. ................ 60/777 |
| 6,641,084 B1 | 11/2003 | Huber |
| 7,118,818 B2 * | 10/2006 | Agnew et al. ................. 429/17 |
| 2004/0091753 A1 * | 5/2004 | Terorde et al. ................ 429/12 |
| 2004/0150366 A1 | 8/2004 | Ferrall |
| 2005/0011179 A1 * | 1/2005 | Ooka et al. .............. 60/39.182 |

FOREIGN PATENT DOCUMENTS

| | | | | |
|---|---|---|---|---|
| DE | 10 53 778 | A | 5/2002 | |
| EP | 0 936 183 | A | 8/1999 | |
| EP | 0 950 636 | A | 10/1999 | |
| GB | 2111602 | A * | 7/1983 | ............ 60/39.645 |

* cited by examiner

*Primary Examiner*—Michael Cuff
*Assistant Examiner*—Phutthiwat Wongwian
(74) *Attorney, Agent, or Firm*—Jeffrey S. Melcher; Manelli Denison & Selter, PLLC

(57) ABSTRACT

A fuel processor (10) comprises a supply of natural gas (12) and a compressor (14), which compresses the natural gas and supplies the natural gas to a partial oxidation reactor (16). A supply of oxygen (20) supplies the oxygen to the partial oxidation reactor (16). The partial oxidation reactor (16) partially reacts the natural gas and the oxygen to form a mixture comprising hydrogen and carbon dioxide. The partial oxidation reactor (16) supplies the mixture of hydrogen and carbon dioxide to a turbine (20). The turbine (20) is arranged to drive the compressor (14). The turbine (20) expands and cools the mixture of hydrogen and carbon dioxide and supplies the mixture of hydrogen and carbon dioxide to a fuel cell stack (22) requiring hydrogen and/or carbon dioxide.

12 Claims, 2 Drawing Sheets

FUEL PROCESSOR

FIELD OF THE INVENTION

The present invention relates to a fuel processor, in particular a fuel processor for a fuel cell or a fuel processor for a gas turbine engine.

BACKGROUND OF THE INVENTION

It is known for fuel processors to process hydrocarbon fuels to generate hydrogen rich fuel mixtures. It is known to supply these hydrogen rich fuel mixtures to fuel cells and/or gas turbine engines.

SUMMARY OF THE INVENTION

Accordingly the present invention seeks to provide a novel fuel processor.

Accordingly the present invention provides a fuel processor comprising a supply of hydrocarbon fuel, a compressor to compress the hydrocarbon fuel and supply the hydrocarbon fuel to a partial oxidation reactor, a supply of oxygen, means to supply the oxygen to the partial oxidation reactor, the partial oxidation reactor being arranged to partially react the hydrocarbon fuel and the oxygen to form a mixture comprising hydrogen and carbon dioxide, the partial oxidation reactor being arranged to supply the mixture of hydrogen and carbon dioxide to a turbine, the turbine being arranged to drive the compressor and the turbine being arranged to expand and cool the mixture of hydrogen and carbon dioxide and to supply the mixture of hydrogen and carbon dioxide to a device requiring hydrogen and/or carbon dioxide.

The device may be a fuel cell or a gas turbine engine.

The turbine may be arranged to drive the compressor via a shaft.

The turbine may be arranged to drive an electrical generator. The turbine may be arranged to drive a compressor for supplying oxygen to the cathodes of the fuel cell. The electrical generator may be arranged to drive an electrical motor and the electrical motor is arranged to drive the compressor.

The electrical generator may be arranged to drive other loads.

The turbine may be arranged to drive other loads.

The supply of oxygen may comprise a supply of air or a supply of oxygen. The supply of oxygen may comprise a supply of air to a first surface of a membrane, the membrane is selectively conducting to oxygen such that oxygen is collected on a second surface of the membrane.

The electrical generator may be arranged to supply electricity to the membrane.

The fuel cell may be arranged to supply electricity to the membrane.

BRIEF DESCRIPTION OF THE DRAWINGS

The present invention will be more fully described by way of example with reference to the accompanying drawings in which.

DETAILED DESCRIPTION OF THE INVENTION

Figure 1:
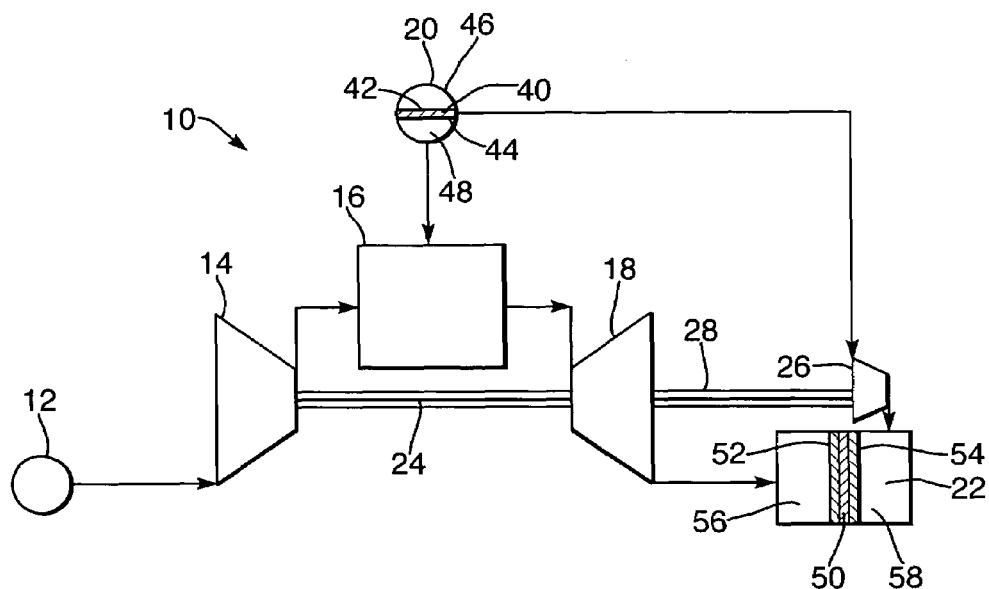
FIG. 1 shows a fuel processor according to the present invention.

A fuel processor 10, as shown in FIG. 1, comprises a supply of a hydrocarbon fuel 12, a compressor 14, a partial oxidation reactor 16, a turbine 18, a supply of oxygen 20 and a fuel cell stack 22.

In operation the compressor 14 compresses and supplies hydrocarbon fuel, for example natural gas, from the supply of hydrocarbon fuel 12 to the partial oxidation reactor 16. Oxygen is supplied from the supply of oxygen 20, for example a supply of air, to the partial oxidation reactor 16.

The partial oxidation reactor 16 partially reacts the hydrocarbon fuel and oxygen together to form a mixture of hydrogen and carbon dioxide. The equation for this reaction, using natural gas, is $CH_4+O_2=2H_2+CO_2$. The supply of oxygen to the partial oxidation reactor 16 is controlled to ensure that the reaction between the hydrocarbon fuel and the oxygen remains stoichiometric and exothermic.

The partial oxidation reactor 16 supplies the mixture of hydrogen and carbon dioxide to the turbine 18, which expands and cools the hydrogen and carbon dioxide. The turbine 18 supplies the mixture of hydrogen and carbon dioxide to the fuel cell stack 22, which requires hydrogen, carbon dioxide or hydrogen and carbon dioxide.

The fuel cell stack 22 comprises one or more fuel cells each of which comprises an electrolyte 50, an anode electrode 52, a cathode electrode 54, an anode chamber 56 and a cathode chamber 58. The mixture of hydrogen and carbon dioxide is supplied in particular to the anode chambers 56 of the fuel cell stack 22.

The turbine 18 is arranged to drive the compressor 14 via a shaft 24 and is also arranged to drive a further load 26. The further load 26 is a further compressor for supplying oxygen from the supply of oxygen 20 to the cathode chambers 58 of the fuel cell stack 22.

The fuel cell stack 22 may comprise solid oxide fuel cells, polymer electrolyte fuel cells or any other suitable fuel cells.

The supply of oxygen 20 comprises a supply of air arranged to supply air to a first chamber 46 partially defined by a first surface 42 of a membrane 40. The membrane 40 is selectively conducting to oxygen such that oxygen is transported through the membrane 40 and is delivered to a second chamber 48 partially defined by a second surface 44 of the membrane 40. An electrical supply is connected to the membrane 40 such that the membrane 40 allows oxygen to be transported through the membrane 40. The oxygen is supplied from the second chamber 48 to the partial oxidation reactor 16.

The electrical supply may be the fuel cell stack 22, an electrical generator driven by the turbine 18 or any other suitable electrical supply.

Figure 2:
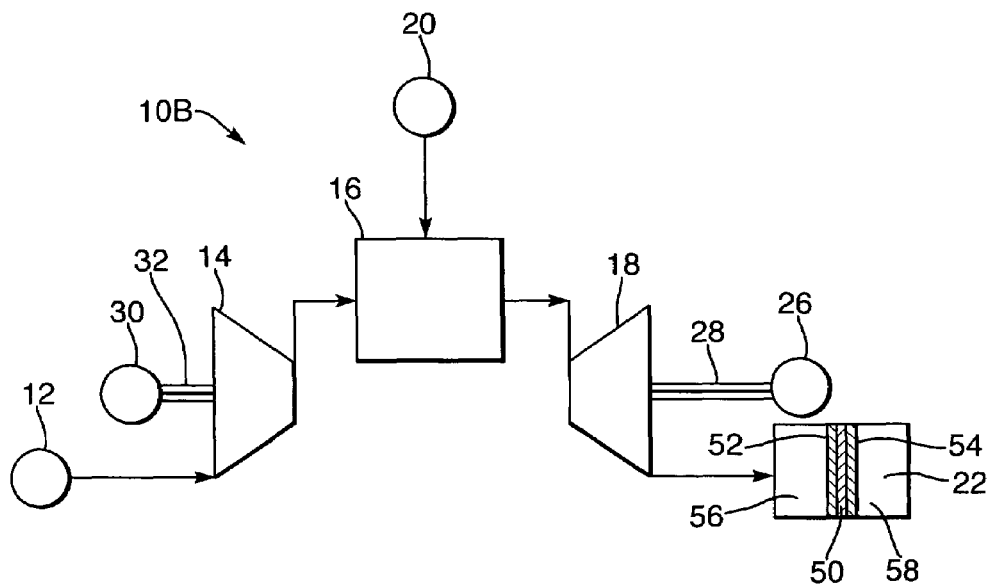
FIG. 2 shows an alternative fuel processor according to the present invention.

A fuel processor 10B as shown in FIG. 2 is substantially the same as that shown in FIG. 1 and like parts are shown by like numerals. The fuel processor 10B, in FIG. 2, differs to that in FIG. 1 in that the turbine 18 does not drive the compressor 14 via a shaft. In this example the turbine 18 drives an electrical generator 26 via the shaft 28 and the electrical generator 26 supplies electricity to an electric motor 30, which is arranged to drive the compressor 14 via a shaft 32.

Figure 3:
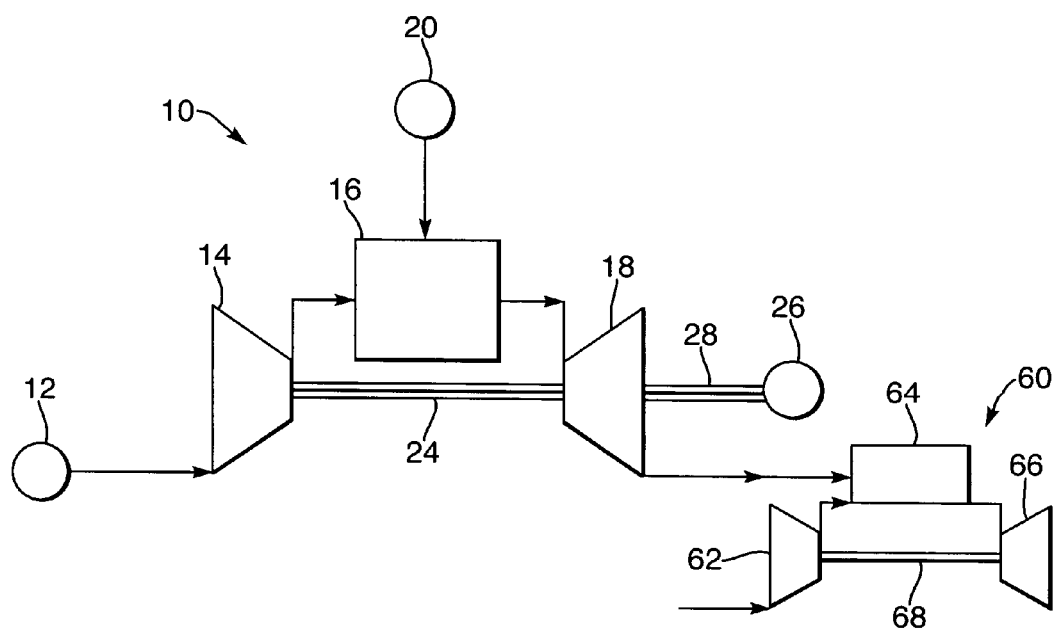
FIG. 3 shows a further fuel processor according to the present invention.

A fuel processor 10C as shown in FIG. 3 is substantially the same as that shown in FIG. 1 and like parts are denoted by like numerals. The fuel processor 10C, in FIG. 3, differs to that in FIG. 1 in that the turbine 18 does not supply the mixture of hydrogen and carbon dioxide to a fuel cell stack 22. In this example the turbine 18 supplies the mixture of hydrogen and carbon dioxide to a gas turbine engine 60.

The gas turbine engine 60 comprises in flow series a compressor 62, a combustor 64, and a turbine 66. The turbine 18 supplies the mixture of hydrogen and carbon dioxide to the combustor 64 of the gas turbine engine 60. The mixture of hydrogen and carbon dioxide is completely combusted in the combustor 64 of the gas turbine engine 60.

One advantage of the present invention is that a hydrogen rich mixture is produced at lower temperature compared to conventional partial oxidation processors, without the cost, weight or volume penalties of heat exchangers. Another advantage of the present invention is that it enables more compact reforming of hydrocarbon fuel for use in low temperature fuel cell stacks, this is particularly important for fuel cell stacks arranged to drive vehicles. A further advantage is that a proportion of the useful chemical work in the hydrocarbon fuel is extracted as useful mechanical work, which may be used to drive ancillary equipment in a complete fuel cell stack system, or gas turbine engine system. An additional advantage is that the mixture of hydrogen and carbon dioxide may be only partially expanded in the turbine to provide pressurisation of the mixture of hydrogen and carbon dioxide supplied to the fuel cell stack or gas turbine engine.

Although the present invention has been described with reference to a device to extract oxygen from air, it may be possible to simply supply air or oxygen.

Although the present invention has been described with reference to the supply of mixtures of hydrogen and carbon dioxide to fuel cell stacks or gas turbine engines, it may be possible to supply the mixture of hydrogen and carbon dioxide to other devices requiring hydrogen, carbon dioxide or a mixture of hydrogen and carbon dioxide.

Although the present invention has been described with reference to the partial oxidation of natural gas it may be possible to use other hydrocarbon fuels, for example ethane, propane, butane, other suitable alkanes or other suitable alkenes to produce a mixture of hydrogen and carbon dioxide.

It is beneficial to use a carbon dioxide capture system for further fuel processing.

The electrical generator may be used to drive other loads.

We claim:

1. A fuel processor comprising a supply of hydrocarbon fuel, a compressor to compress the hydrocarbon fuel and supply the hydrocarbon fuel to a partial oxidation reactor, a supply of oxygen wherein the supply of oxygen comprises a supply of air to a first surface of a membrane, the membrane is selectively conducting to oxygen such that oxygen is collected on a second surface of the membrane, means to supply the oxygen to the partial oxidation reactor, the partial oxidation reactor being arranged to partially react the hydrocarbon fuel and the oxygen to form a mixture comprising hydrogen and carbon dioxide wherein said partial oxidation reactor is supplied with hydrocarbon fuel and oxygen without any other elements being supplied thereto, the partial oxidation reactor being arranged to supply the mixture of hydrogen and carbon dioxide directly to a turbine, the turbine being arranged to drive the compressor, the turbine being arranged to expand and cool the mixture of hydrogen and carbon dioxide and to supply the mixture of hydrogen and carbon dioxide to a device requiring hydrogen or carbon dioxide wherein the device is selected from the group comprising a fuel cell and a gas turbine engine.

2. A fuel processor as claimed in claim 1 wherein the turbine is arranged to drive the compressor via a shaft.

3. A fuel processor as claimed in claim 1 wherein the turbine is arranged to drive an electrical generator.

4. A fuel processor as claimed in claim 3 wherein the electrical generator is arranged to drive an electrical motor and the electrical motor is arranged to drive the compressor.

5. A fuel processor as claimed in claim 3 wherein the electrical generator is arranged to drive other loads.

6. A fuel processor as claimed in claim 1 wherein the turbine is arranged to drive further loads.

7. A fuel processor as claimed in claim 1 wherein an electrical generator is arranged to supply electricity to the membrane.

8. A fuel processor as claimed in claim 1 wherein a fuel cell is arranged to supply electricity to the membrane.

9. A fuel processor as claimed in claim 1 wherein the turbine is arranged to drive a further compressor for supplying oxygen to the cathodes of the fuel cell.

10. A fuel processor as claimed in claim 1 wherein the supply of hydrocarbon fuel is selected from the group comprising a supply of natural gas and a supply of methane.

11. A fuel processor comprising a supply of hydrocarbon fuel, a compressor to compress the hydrocarbon fuel and supply the hydrocarbon fuel to a partial oxidation reactor, a supply of oxygen wherein the supply of oxygen comprises a supply of air to a first surface of a membrane, the membrane is selectively conducting to oxygen such that oxygen is collected on a second surface of the membrane, means to supply the oxygen to the partial oxidation reactor, the partial oxidation reactor being arranged to partially react the hydrocarbon fuel and the oxygen to form a mixture comprising hydrogen and carbon dioxide wherein said partial oxidation reactor is supplied with hydrocarbon fuel and oxygen without any other elements being supplied, the partial oxidation reactor being arranged to supply the mixture of hydrogen and carbon dioxide directly to a turbine, the turbine being arranged to drive the compressor, the turbine being arranged to expand and cool the mixture of hydrogen and carbon dioxide and to supply the mixture of hydrogen and carbon dioxide to a device requiring hydrogen or carbon dioxide wherein the device is a fuel cell.

12. A fuel processor comprising a supply of hydrocarbon fuel, a compressor to compress the hydrocarbon fuel and supply the hydrocarbon fuel to a partial oxidation reactor, a supply of oxygen wherein the supply of oxygen comprises a supply of air to a first surface of a membrane, the membrane is selectively conducting to oxygen such that oxygen is collected on a second surface of the membrane, means to supply the oxygen to the partial oxidation reactor, the partial oxidation reactor being arranged to partially react the hydrocarbon fuel and the oxygen to form a mixture comprising hydrogen and carbon dioxide wherein said partial oxidation reactor is supplied with hydrocarbon fuel and oxygen without any other elements being supplied, the partial oxidation reactor being arranged to supply the mixture of hydrogen and carbon dioxide directly to a turbine, the turbine being arranged to drive the compressor, the turbine being arranged to expand and cool the mixture of hydrogen and carbon dioxide and to supply the mixture of hydrogen and carbon dioxide to a device requiring hydrogen or carbon dioxide wherein the device is a gas turbine engine.

* * * * *